United States Patent [19]

Aiyama

[11] Patent Number: 5,666,730

[45] Date of Patent: Sep. 16, 1997

[54] POWER WORKING MACHINE

[75] Inventor: Fumihiko Aiyama, Musashimurayama, Japan

[73] Assignee: Kioritz Corporation, Tokyo, Japan

[21] Appl. No.: 582,888

[22] Filed: Jan. 4, 1996

[30] Foreign Application Priority Data

Jan. 5, 1995 [JP] Japan .................................. 7-000168

[51] Int. Cl.⁶ .................................................. B26B 19/02
[52] U.S. Cl. .................................................. 30/220; 30/216
[58] Field of Search ........................... 30/208, 209, 206, 30/210, 215, 216, 220, 224

[56] References Cited

U.S. PATENT DOCUMENTS

| | | | |
|---|---|---|---|
| 3,161,954 | 12/1964 | Riley, Jr. | 30/224 |
| 3,212,188 | 10/1965 | Riley, Jr. | 30/216 |
| 3,595,878 | 7/1971 | Irelan et al. | 30/220 |
| 3,902,243 | 9/1975 | Klebe, Jr. | 30/220 |
| 3,934,340 | 1/1976 | Jones et al. | 30/220 |
| 3,971,130 | 7/1976 | Querfurth et al. | 30/220 |
| 5,531,027 | 7/1996 | Martinez et al. | 30/216 |

*Primary Examiner*—Hwei-Siu Payer
*Attorney, Agent, or Firm*—Cushman Darby & Cushman IP Group of Pillsbury Madison & Sutro LLP

[57] ABSTRACT

A power working machine in which maintenance work is improved by having the heads of case fastening and motor fastening screws covered by the gasket provided between the mount base and the transmission cover. This prevents dirt load grease from clogging the heads of such screws. The transmission cover is also provided with through holes for the motor fastening screws and the case fastening screws, respectively.

2 Claims, 6 Drawing Sheets

POWER WORKING MACHINE

BACKGROUND OF THE INVENTION

1. Field of the Invention

The present invention relates to a power working machine such as a hedge trimmer, and more particularly to the construction of a transmission case cover of the power working machine.

2. Description of the Related Art

A power working machine such as a hedge trimmer generally comprises: a prime mover case portion with a built-in prime mover such as an electric motor or an internal combustion engine; a mount base portion constituting a transmission case in which a power transmission mechanism such as gears driven by the prime mover is installed; a working portion comprising clipper blades and the like which are driven by the prime mover through the power transmission mechanism; and a handle connected to the mount base portion. The mount base portion is provided with a transmission cover for the power transmission mechanism at the bottom portion thereof, and the transmission cover is fastened and fixed to the mount base portion through a plurality of fastening screws. The prime mover and the case there of are fastened and fixed to the mount base portion from the bottom portion thereof through a plurality of fastening screws, and some of the fastening screws are covered by the transmission cover, and others are directly exposed to outside.

SUMMARY OF THE INVENTION

As described above, at the bottom portion of the mount base portion of the power working machine, numerous fastening screws are arranged, and some of them are covered by the transmission cover, so that the fastening screws must always be loosened to inspect or fix the prime mover or the power transmission mechanism in many cases such as after the power working machine is used. That is, even when the power transmission mechanism is need not to be inspected but only the prime mover is to be removed for inspection or fixing, every time, first the fastening screws for the transmission cover are loosened to remove the transmission cover, and then it is necessary to loosen the fastening screws for the prime mover to remove the prime mover.

Therefore, there are problems that grease filled in the transmission case may be leaked; the grease may adhere to workers; or dust and the like may stick to the inner portion of the transmission case.

Further, since the heads of some fastening screws for the prime mover case or the primer mover itself are always exposed to outside, soil, mote or dust may stick to the heads, causing screwdriver insertion channels to be clogged.

In addition, when the power transmission mechanism is inspected or fixed, tapped holes for the fastening screws for the prime mover case or the prime mover itself are exposed to outside, which may cause the grease in the transmission case, dust or the like to be adhered to the tapped holes.

The present invention has been accomplished to eliminate the above-mentioned problems, and the object thereof is to provide a power working machine in which when the maintenance work such as inspection and fixing for the prime mover or the power transmission mechanism of the power working machine is carried out, disassembling or assembling work is reduced to minimum; the heads of the fastening screws and the tapped holes of the prime mover case and the prime mover itself are free from dust or the like; and the intrusion of dust or the like to the inner portion of the transmission case is prevented so that the leakage of grease and adherence of grease to workers are reduced.

To achieve the above-mentioned object, in a power working machine according to the present invention, a prime mover and a case thereof are situated on an upper surface of a mount base; the prime mover and the case thereof are fastened and fixed to the mount base by prime mover fastening screws and case fastening screws which are inserted through a lower surface of the mount base; and a transmission cover for covering the lower surface of the mount base is fastened and fixed to the lower surface through cover fastening screws, characterized in that: a gasket is situated between the lower surface of the mount base and the transmission cover; the gasket is provided with through holes for cover fastening screws and a transmission member assembling opening; and the transmission cover is provided with through holes for the prime mover fastening screws and the case fastening screws.

In the present invention, a gasket is provided with no holes except for screw through holes through which transmission cover fastening screws pass, and except for a transmission member assembling opening; and the heads of prime mover fastening screws are covered with the gasket and the transmission cover, which allows the heads of the screws not to be exposed directly to outside.

At inspection, fixing or the like, the transmission cover fastening screws are loosened so as to be removed, and then the transmission cover is removed, which allows the inspection or the like for the power transmission mechanism to be carried out through the transmission member assembling opening of the gasket.

In case that the prime mover case and the prime mover are removed to perform maintenance work such as inspection, a tip blade portion of the screw driver as a screw fastening and fixing tool is inserted through the through holes for the transmission cover to break through the gasket at the inside of the transmission cover so as to be engaged with the screwdriver insertion channels of the heads of the prime mover fastening screws at the inside of the gasket.

BRIEF DESCRIPTION OF THE DRAWINGS

The present invention will be more apparent from the detailed description with reference to the accompanying drawings wherein.

DETAILED DESCRIPTION OF PREFERRED EMBODIMENTS

Now, a power working machine according to an embodiment of the present invention will be explained with reference to the drawings.

Figure 1:
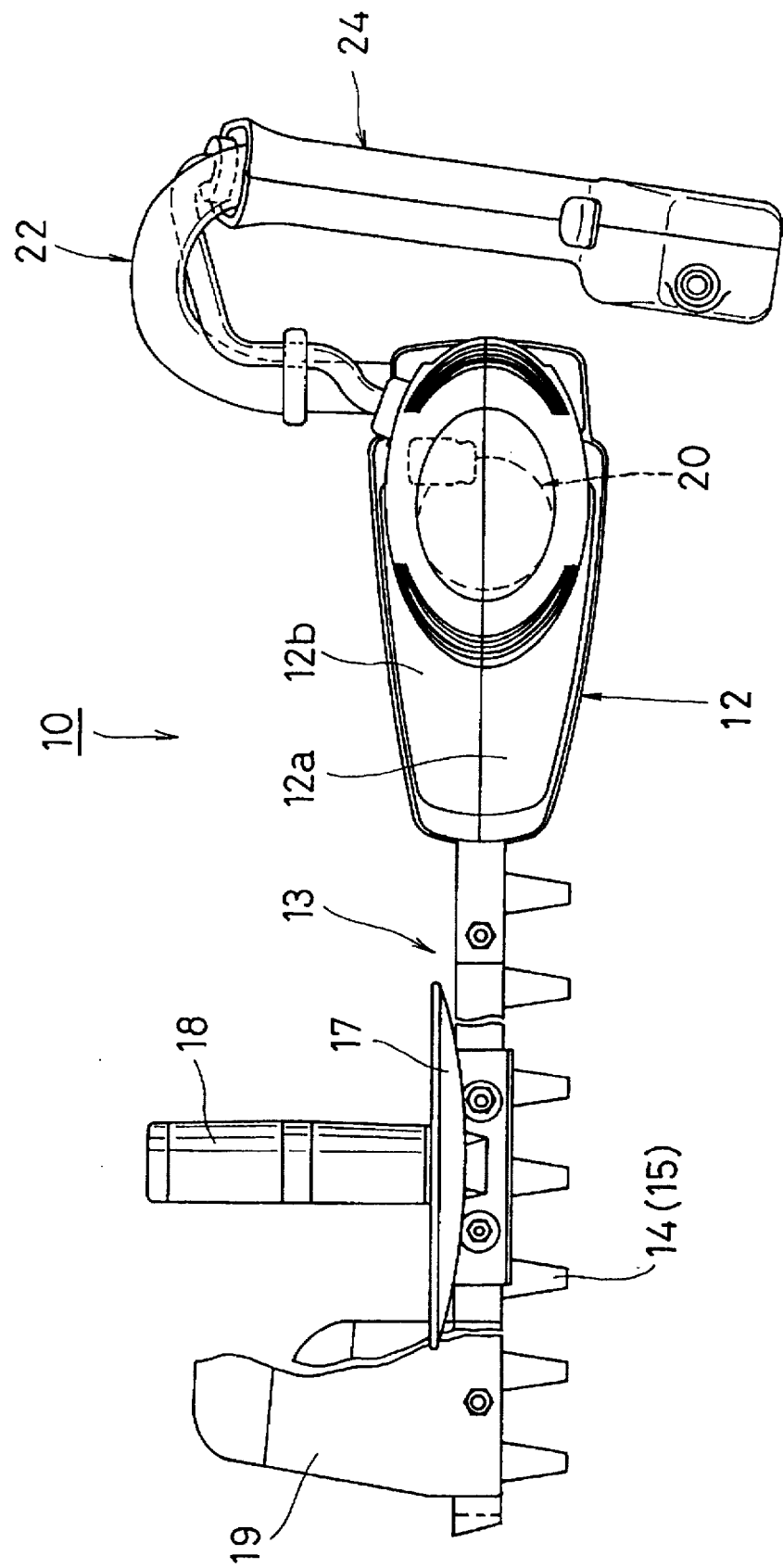
FIG. 1 is a plan view of a clipper-type hedge trimmer as a power working machine according to an embodiment of the present invention.
Figure 2:
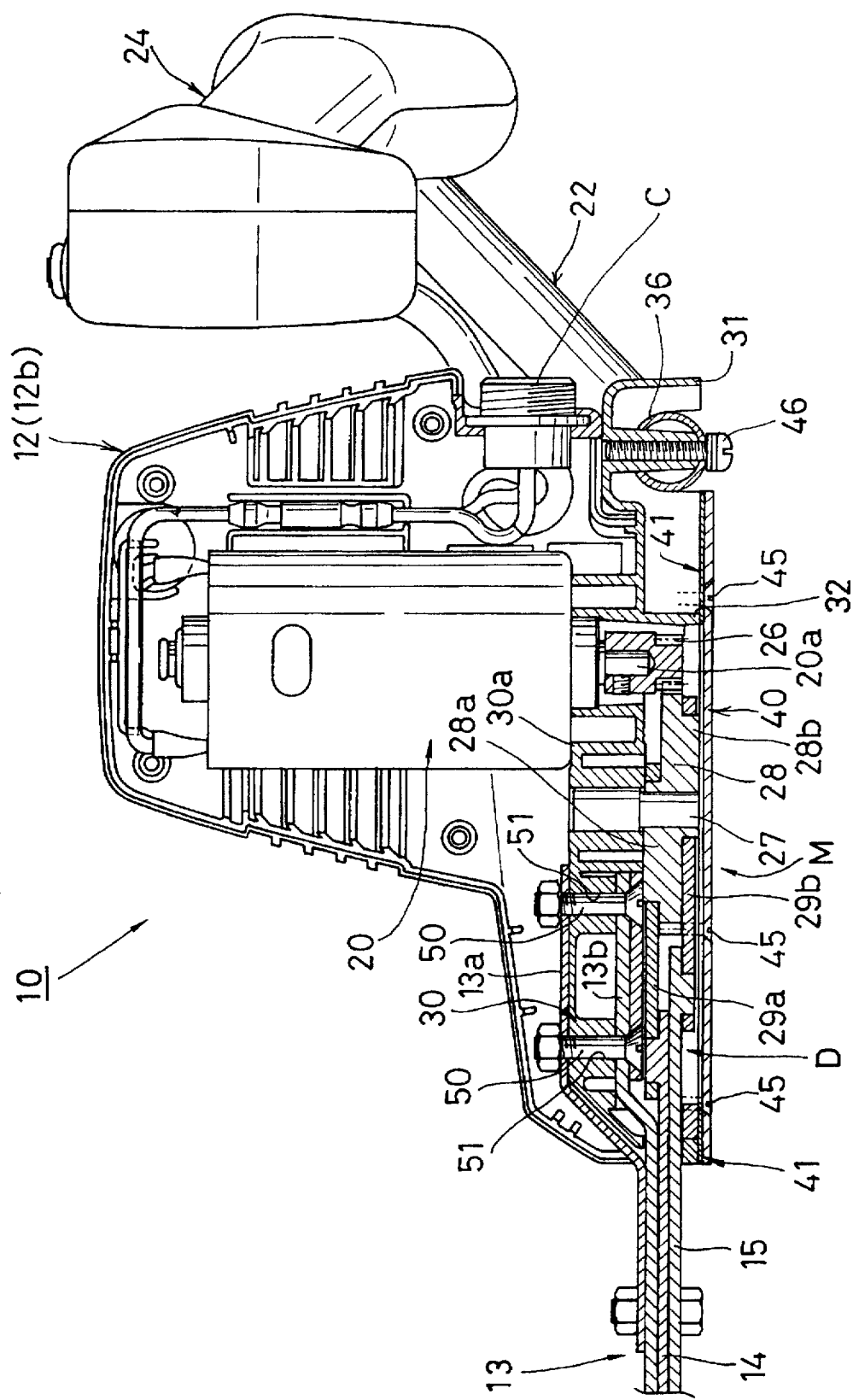
FIG. 2 is a cross-sectional view of a primary portion (mount base portion) of the hedge trimmer shown in FIG. 1.
Figure 3:
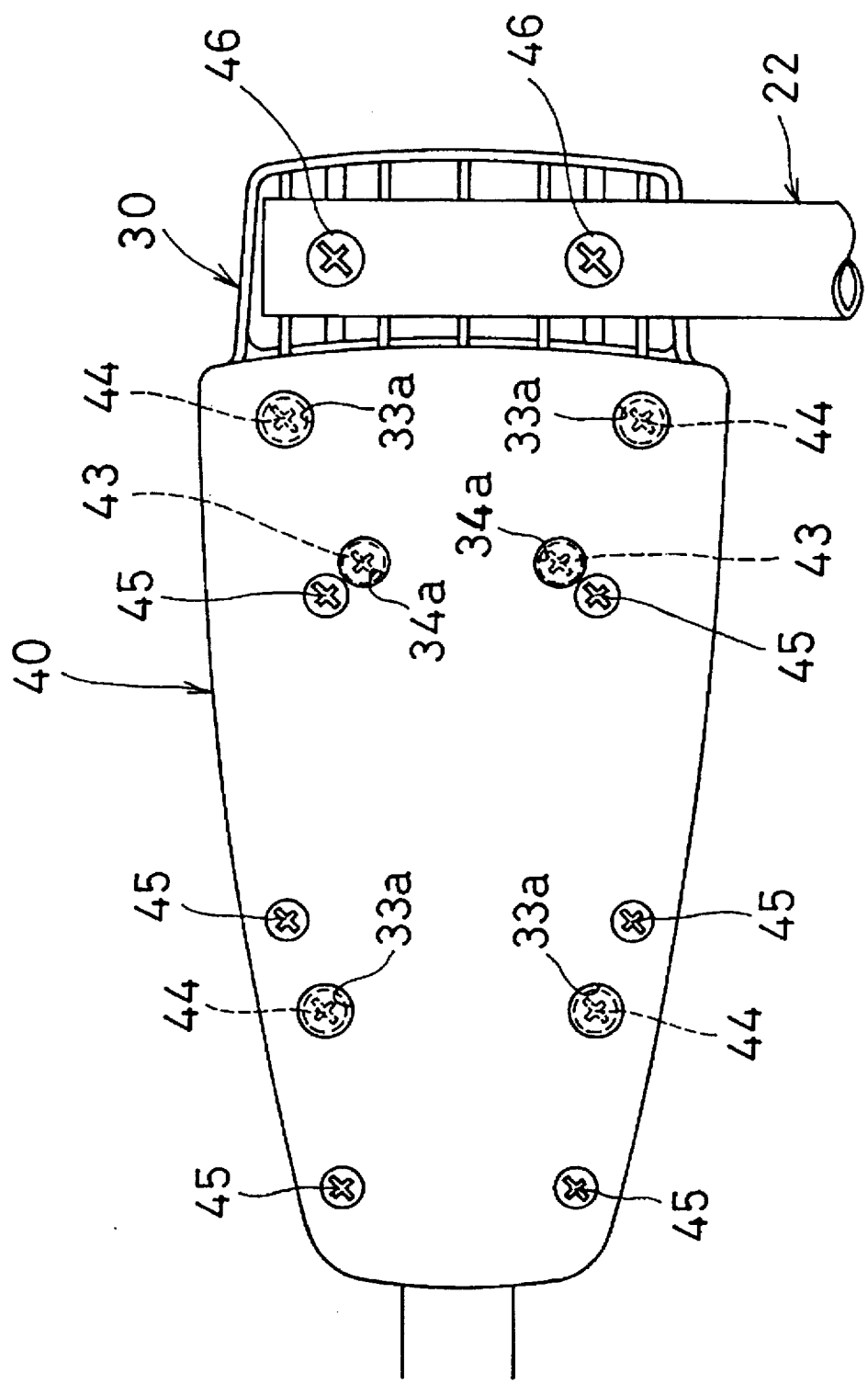
FIG. 3 is a bottom view of the primary portion of the hedge trimmer illustrated in FIG. 2.

FIGS. 1 to 3 are an overall plan view, a cross-sectional view of a primary portion (mount base portion), and a bottom view of the primary portion of a hedge trimmer 10 as a power working machine according to an embodiment of the present invention.

The hedge trimmer 10 according to this embodiment comprises: a two-part motor case 12 with a built-in 12-V DC motor having a ski shoe like form consisting of a left case half 12a and a right case half 12b; a mount base 30 in which a power transmission mechanism M (described below) driven by the DC motor is disposed; a transmission cover 40 for the power transmission mechanism M; a working portion 13 comprising a pair of clipper blades 14 and 15 and a grass gathering plate 19, the clipper blades 14, 15 being vertically stacked and driven by the DC motor 20 through the power transmission mechanism M, and a grass gathering plate 19; a front handle 18 with a protector 17 which is mounted to the working portion 13; a substantially U-shaped rear handle 22 which is connected to the motor case 12; and a grip portion 24 mounted to the upper end portion of the rear handle 22.

Figure 4:
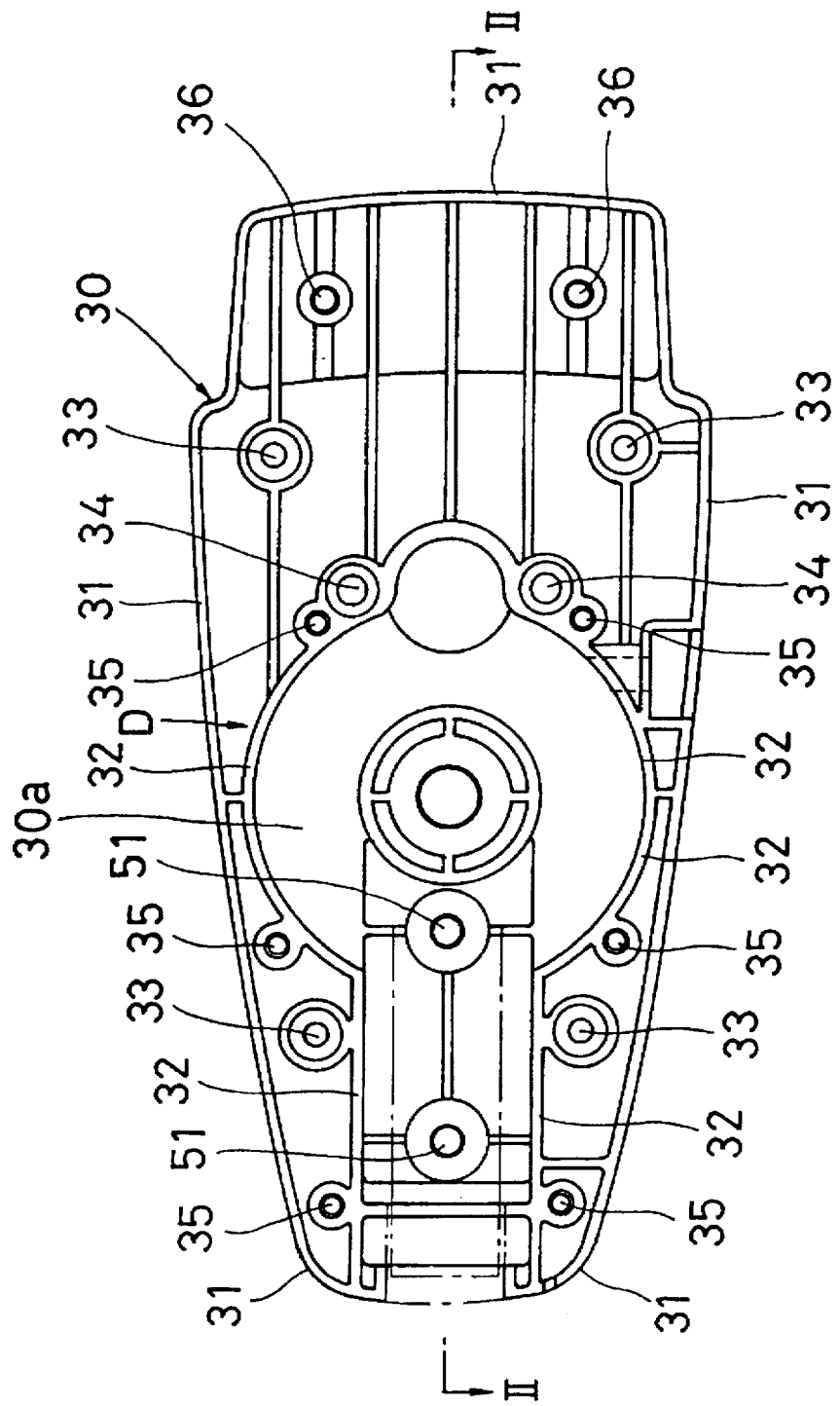
FIG. 4 is a bottom view of the mount base shown in FIG. 2.
Figure 5:
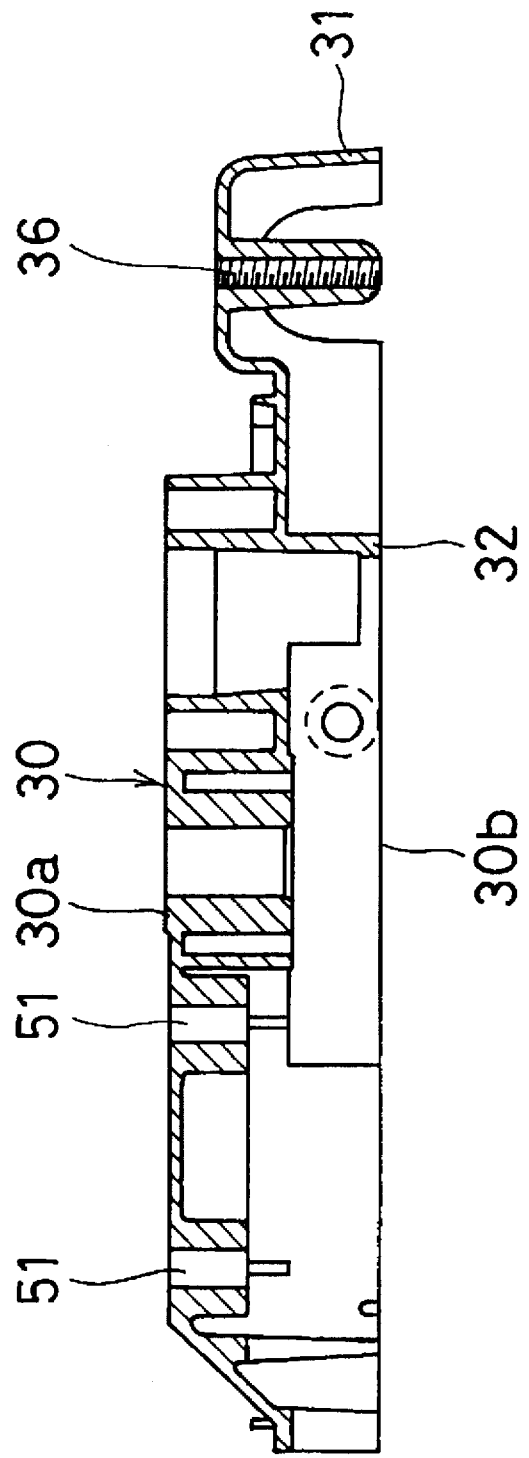
FIG. 5 is a cross-sectional view taken along the line II—II in FIG. 4.

The mount base 30, as illustrated in FIGS. 4 and 5, is provided with upper and lower surfaces 30a and 30b which are in parallel with each other, and the mount base 30 is made by aluminum alloy monoblock die casting. The DC motor 20 is mounted and fixed to the upper surface 30a, and the transmission cover 40 is fixed to the lower surface 30b through a gasket 41.

The lower surface 30b of the mount base 30 is provided with a seal edge portion 31 at the outer periphery thereof and is further provided at the inner portion of the seal edge portion 31 with an inner seal edge portion 32 with a shape of rectangle at its front and circle at its rear. The inner seal edge portion 32 constitutes a transmission case D, and the power transmission mechanism M is situated in the transmission case D. The working portion 13 is mounted and fixed through working portion fastening bolts 50, which are inserted into through holes 51 formed on the mount base 30, with a front portion of the inner seal edge portion 32 of the mount base 30 being sandwitched by upper and lower mounting members 13a and 13b thereof.

Four case fastening screw through holes 33 with countersinks pass through the upper and lower surfaces 30a and 30b of the mount base 30 to mount the motor case 12. Further, on the mount base 30 are formed two motor mounting screw through holes 34 with countersinks to mount the DC motor 20, six cover mounting screw through holes 35 to mount the transmission cover 40, and two handle mounting screw through holes 36 to mount the rear handle 22.

The power transmission mechanism M, which is located in the transmission case D, drives the clipper blades 14, 15 in a manner described below. A pinion 26 fixed to a vertically projecting output shaft 20a of the DC motor 20 meshes a cam gear 28 of which eccentric cam portions 28a, 28b of which phases are shifted by 180 degrees with each other are formed on the upper and lower portions thereof. The cam gear 28 is rotatably supported by a supporting shaft 27 so that the rotational driving force of the DC motor 20 is transmitted from the pinion 26 to the cam gear 28. Then, the rotational power of the cam gear 28 is transmitted to reciprocating linear movement of the upper clipper blade 14 through a connecting member 29a from the upper eccentric cam portion 28a, and is further transmitted to reciprocating linear movement of the lower clipper blade 15 through a connecting member 29b from the lower eccentric cam portion 28b, so that the upper and lower clipper blades 14, 15 performs reciprocating motion with inverse phase with each other to cut tree branches and plants.

Figure 6:
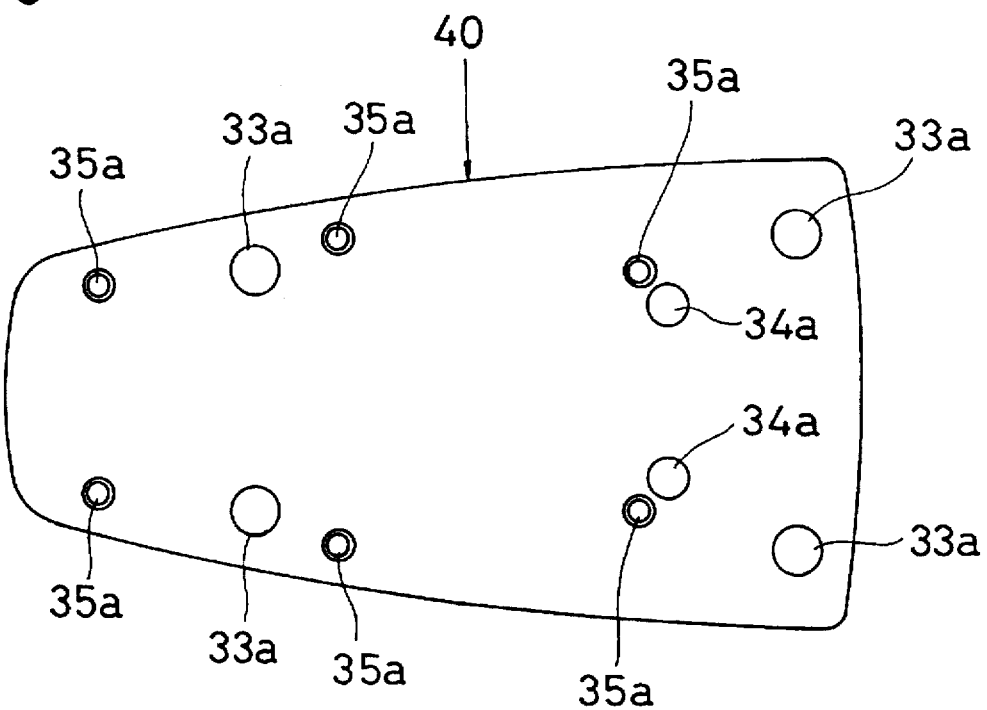
FIG. 6 is a bottom view of the transmission cover according to the embodiment illustrated in FIG. 2.

The transmission cover 40 is made of thin steel plate or the like and has a shape of flat plate. The shape of the transmission cover 40 is decided so as to enclose the overall lower surface 30b of the mount base 30 except for the mounting portion for the rear handle 22. As illustrated in FIG. 6, the transmission cover 40 is provided with six through holes 35a with countersinks to mount and fix the transmission cover 40 itself, and four screwdriver through holes 33a through which a screw driver as a fastening tool for fastening and fixing the motor case 12 is inserted, and two screwdriver through holes 34a through which a screwdriver is inserted to fasten and fix the DC motor 20.

Figure 7:
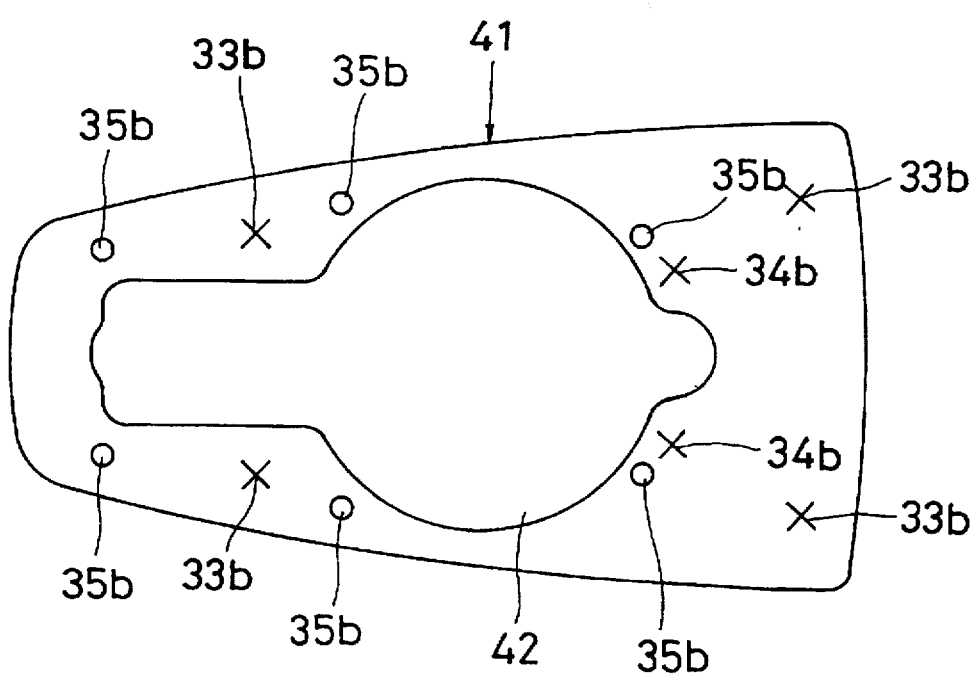
FIG. 7 is a bottom view of the gasket shown in FIG. 2.

The gasket 41 is clamped between the mount base 30 and transmission cover 40. The gasket 41, as illustrated in FIG. 7, is made of commonly known gasket material with a shape of thin plate, and the outer periphery thereof has the same shape as the transmission cover 40. On the gasket 41, a transmission member assembling opening 42 for the transmission case D is formed, and the shape of the opening 42 is the same as the inner periphery of the inner seal edge portion 32 which is rectangle at its front and circle at its rear. As a result, the transmission member is easily mounted and dismounted, and the gasket 41, which is subject to be rubbed by the transmitting member during operation and be damaged, is cut away in advance. The gasket 41 is further provided with six screw through holes 35b for fixing the transmission cover 40.

If necessary, marks 33b and 34b may be made at positions corresponding to the case fastening screw through holes 33 and the motor mounting screw through holes 34.

Reference symbol C in FIG. 2 is a connecter for a power source cord from battery pack not shown which may be carried on the worker's back.

When assembling the motor case 12, the DC motor 20, the mount base 30, the gasket 41 and the transmission cover 40 described above, after the DC motor 20 is mounted to the upper surface 30a of the mount base 30, two motor fastening screws 43 (flat countersunk screws) with slightly smaller heads in comparison with the screwdriver through holes 34a are inserted from the lower portion of the mount base 30 through the two motor mounting screw through holes 34 of the mount base 30 and are screwed into tapped holes not shown for fastening the motor 20, which is formed at the lower portion of the DC motor 20, to fix the motor 20. Then, the motor case 12 is mounted on the upper surface 30a of the mount base 30 to cover the DC motor 20, and four motor case fastening screws 44 (flat countersunk screws) with slightly smaller heads in comparison with the screwdriver through holes 33a are inserted from the lower portion of the mount base 30 through the four case fastening screw through holes 33 of the mount base 30 and are screwed into tapped holes not shown for fastening the motor case 12, which is formed at the lower portion of the motor case 12, to fix the motor case 12.

Then, the power transmission mechanism M is built in the transmission case D which is situated on the lower surface 30b side of the mount base 30; the gasket 41 is mounted on the lower surface 30b of the mount base 30, and the transmission cover 40 is attached to the gasket 41; the six cover fastening screws 45 are inserted and screwed into the six through holes 35a of the transmission cover 40 and the six through holes 35b of the gasket 41 until the heads of the screws 45 being slightly sank below the surface of the transmission cover 40 to fix the transmission cover 40.

On the other hand, the rear handle 22 is fastened and fixed by screwing the two handle fastening screws 46 to the two handle mounting tapped holes 36.

In this embodiment, the clipper-type hedge trimmer 10 is constructed as described above, and the gasket 41 is provided with no holes except for the six through holes 35b, through which the six cover fastening screws 45 pass, and except for the transmission member assembling opening 42. Therefore, the heads of the fastening screws 44 for the motor case 12 and the fastening screws 43 for the DC motor 20 are covered with the gasket 41, so that the heads thereof are not exposed to outside. As a result, there is no fear that the heads of the case fastening screws 44 and the motor fastening screws 43 are soiled by soil, dust and so on to cause the screwdriver insertion channels to be clogged.

The hedge trimmer 10 with the above-mentioned construction according to this embodiment is used in such a manner that a worker grasps the front handle 18 and the grip portion 24 of the rear handle 22 to operate the hedge trimmer 10. If maintenance work such as inspection and fixing, for example, after a long term operation, is necessary, the following procedures may be taken.

When the power transmission mechanism M in the transmission case D to be inspected, fixed and so on, the six cover fastening screws 45 are loosened and removed to remove the transmission cover 40, which allows the maintenance work such as inspection and fixing of the power transmission mechanism M through the transmission member assembling opening 42 of the gasket 41. In this case, it is unnecessary to remove the gasket 41, which eliminates possibilities, for instance, that grease or the like in the transmission case D adheres to the heads of the fastening screws 44 for the motor case 12 and the heads of the fastening screws 43 for the DC motor 20.

When the motor case 12 and DC motor 20 are removed to carry out the maintenance work such as inspection and fixing, the tip blade like portion of the screw driver, which is inserted through four through holes 33a for the motor case 12 and the two through holes 34a for the motor 20, breaks through the gasket 41 in the transmission cover 40 so as to be engaged with the screwdriver insertion channels of the heads of the fastening screws 44 for the motor case 12 and the heads of the fastening screws 43 for the DC motor 20. Then, the fastening screws 44 for the motor case 12 and the fastening screws 43 for the DC motor are loosened to remove them for the maintenance work such as inspection and fixing. In this case, it is unnecessary to remove the transmission cover 40, so that grease or the like in the transmission case D does not adhere to cloths of the worker to make it dirty, and soil or dust may not enter the transmission case D. Moreover, even though the gasket 41 is broken by the screwdriver, the function of the hedge trimmer 10 will not be affected at all.

One embodiment of the present invention has been explained. However, the present invention is not limited to the above embodiment, and it is possible to change the construction of the hedge trimmer or the like in design in various manner without departing from the scope of claimed invention.

For instance, in this embodiment, the explanation has been made when a power working machine according to the present invention is applied to a clipper-type hedge trimmer, however, this invention may be applied widely to other power working machine with a prime mover.

As described above, in the present invention, a gasket is provided with no holes except for screw through holes through which transmission cover fastening screws pass, and except for a transmission member assembling opening; and heads of prime mover fastening screws are covered with the gasket and the transmission cover, which allows the heads of the screws not to be exposed directly to outside.

Further, in case that a prime mover case and a prime mover itself are removed to perform maintenance work such as inspection and fixing, the gasket in the transmission cover may be broken, and the fastening screws for the prime mover case and the prime mover itself are loosened to perform the maintenance work. As a result, it is unnecessary to remove the transmission cover, so that grease or the like in the transmission case does not adhere to the cloth of the worker to make it dirty, and soil or dust may not intrude the transmission case.

What is claimed is:

1. In a power working machine, a prime mover (20) and a case (12) thereof are situated on an upper surface (30a) of a mount base (30); the prime mover (20) and the case (12) thereof are fastened and fixed to the mount base (30) by prime mover fastening screws (43) and case fastening screws (44) which are inserted through a lower surface (30b) of the mount base (30); and a transmission cover (40) for covering the lower surface (30b) of the mount base (30) is fastened and fixed to the lower surface (30b) through cover fastening screws (45), characterized in that: a gasket (41) is situated between said lower surface (30b) of the mount base (30) and said transmission cover (40); and said gasket (41) is provided with through holes (35b) for said cover fastening screws (45) and a transmission member assembling opening (42).

2. The power working machine as claimed in claim 1, wherein said transmission cover (40) is provided with through holes (33a, 34a) for the prime mover fastening screws (43) and the case fastening screws (44).

* * * * *